United States Patent

Maly-Schreiber et al.

[11] Patent Number: 5,811,207
[45] Date of Patent: Sep. 22, 1998

[54] CHARGE EXCHANGE BODY WITH LARGE ACTIVE SURFACE AND A METHOD FOR MANUFACTURE THEREOF

[75] Inventors: Martha Maly-Schreiber; Aronld van Zyl, both of Ulm; Josef Ritter, München; Reinhold Hilpert, Moorenweis, all of Germany

[73] Assignee: Daimler-Benz AG, Germany

[21] Appl. No.: 616,002

[22] Filed: Mar. 14, 1996

[30] Foreign Application Priority Data

Mar. 14, 1995 [DE] Germany ............... 195 09 074.8

[51] Int. Cl.$^6$ ............................................. H01M 4/02
[52] U.S. Cl. ............................ 429/213; 429/2; 29/623.1
[58] Field of Search ........................... 429/2, 213, 224; 29/623.1

[56] References Cited

U.S. PATENT DOCUMENTS 3,881,960  5/1975  Haschka et al. ........................ 429/2
5,147,841  9/1992  Wilcoxon .

FOREIGN PATENT DOCUMENTS 36 42 674  6/1988  Germany .

*Primary Examiner*—M. Nuzzolillo
*Attorney, Agent, or Firm*—Evenson, McKeown, Edwards & Lenahan, P.L.L.C.

[57] ABSTRACT

The invention relates to a charge exchange body with a large active surface as well as the method for its manufacture. The porous supporting structure of the charge exchange body is made of granular structural material, with the average diameter of the grains of the structural material being smaller than 1 μm, especially smaller than 250 nm, and with the grain size differing by a maximum of 40% from its statistical average in more than 60% of the grains of the structural material. In order to make such grains, a dispersion is mixed with biochemical hollow bodies that have an inside diameter according to the above requirements. Salts are added to the dispersion and dissolve therein to form structural ions, with the structural ion being an ion of an element required for the structural material, or a corresponding compound. The structural ions are arranged in the closed cavity of the hollow body, with the grains of the structural material or a preproduct of corresponding shape being formed with them and released by removal of the shells of the hollow bodies.

34 Claims, 2 Drawing Sheets

CHARGE EXCHANGE BODY WITH LARGE ACTIVE SURFACE AND A METHOD FOR MANUFACTURE THEREOF

BACKGROUND AND SUMMARY OF THE INVENTION

The invention relates to a charge exchange body of the type suitable for use in a catalyst which functions on the basis of a charge exchange, or in electrodes of an electric cell. Specifically, the invention relates to a charge exchange body which provides a large active surface for the exchange of ions or electrons, and to a method for manufacture thereof.

Since the principle of charge exchange is the same for electrodes as for the catalysts under consideration, the charge exchange body will be described herein only with reference to an electrode of an electrochemical storage device. It is known in battery technology to use electrodes that have a porous supporting structure in the individual cells of electrochemical storage devices. Because the electrolyte can penetrate the porous supporting structure of such electrodes, an active surface greater than the external surface area of the electrode is available for charge exchange produced by the current. The active surface area for exchange of ions and/or electrons depends on the nature of the reaction, the nature of the structural material of the supporting body of the electrode and the electrical properties of the reaction constituents. Assuming that the material of the electrode possesses sufficient electrical conductivity, it can generally be said that in electrodes of the inclusion type, the active surface for the charge exchange is represented by the true boundary surfaces between the structural material and the electrolyte.

In electrodes with displacement reactions, the reaction constituents often possess electronic insulating properties. In this case, delivery and removal must be improved by an additional material with good electrical conductivity, such as carbon and/or metal powder that is added in addition to the structural material which is then a two-phase mixture. In such a configuration, the active surface for charge exchange is determined by the boundary surfaces of the three-phase electrolyte/electrode/electric conductors. As a result, a high percentage of the mass of the structural material is not directly available for electron exchange and changes sharply as a function of the charge state. Since it is a basic desire in battery technology to improve the weight and/or space related performance of the individual cells or the electrochemical storage device, these points are of particular importance.

An object of the invention is therefore to provide a charge exchange body of the type described above, which provides improved performance, and whose porous supporting structure can be produced as closely as possible within limited tolerances.

These and other objects and advantages are achieved in a basic charge exchange body according to the invention, in which the active surface is designed for electrochemical charge exchange, thereby increasing the performance of the charge exchange body, with low manufacturing tolerances. According to the invention, the functional centers of the supporting structure of the charge exchange body are deliberately formed and frozen in the submicron range, so that similar conditions prevail for electrochemical charge exchange at all times of charging and discharging.

In special cases, the structural material is a functional material whose functionality is achieved by the arrangement or anchoring of two phases with different properties. Functional materials of this kind play an important role, especially in catalysis, where charge carriers are transferred locally.

Other objects, advantages and novel features of the present invention will become apparent from the following detailed description of the invention when considered in conjunction with the accompanying drawings.

DETAILED DESCRIPTION OF THE DRAWINGS

Figure 1:
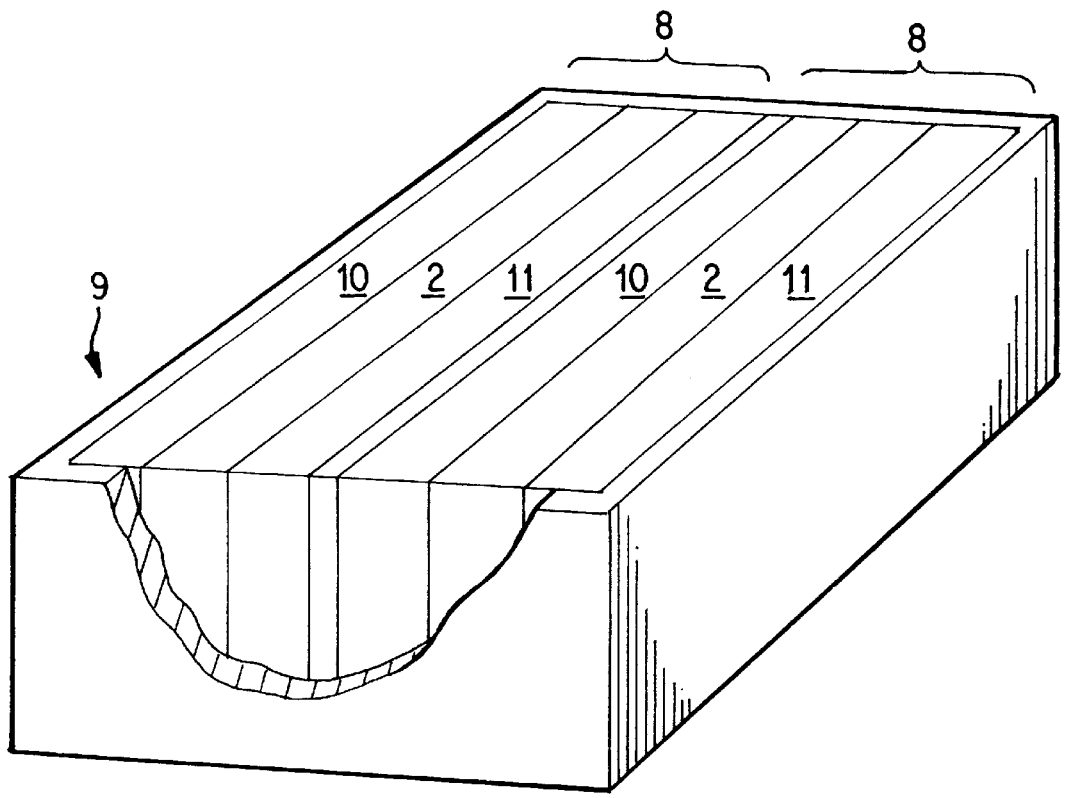
FIG. 1 shows a section of an electrochemical storage device with a plurality of individual cells.

FIG. 1 shows an electrochemical storage device 9, with individual cells 8 having a plate design, such as may be used for example in batteries, storage batteries, and the like. The invention, of course, is not limited to electrodes of such individual cells 8, but can also be applied in simple fashion to other batteries, for example with coated or wound electrodes 10, 11, and the like, as well as to catalysts of the charge exchange type. In the present embodiment, electrodes 10, 11 correspond to the charge exchange body, and have a supporting structure formed of grains 1 of structural material (FIG. 2).

The individual cells 8 according to FIG. 1 have two opposite and spatially separate electrodes 10, 11, between which a protective element 2 is advantageously inserted. The protective element 2 exhibits good electrical conductivity, at least at voltages greater than a switching threshold that corresponds at its maximum to a breakdown or destructive voltage of an individual cell 8. Thus, beyond the switching threshold, the two electrodes 10, 11 are connected together in an electrically conducting fashion by protective element 2. Below the switching threshold (in other words at operating voltage), protective element 2 constitutes an insulator. The switching threshold is defined here as that voltage which, at the maximum, is equal to the destructive voltage of individual cell 8 and at which the resistance of protective element 2 changes from high ohmic values (an electrically insulating state) to low-ohmic values (an electrically conducting state). In order for an electrical voltage to be tapped off electrodes 10, 11 of individual cell 8 during operation (and hence during the insulating state of protective element 2), porous protective element 2 is filled at least partially with the electrolyte of individual cell 8.

With this design it is possible to provide protection against destruction or overcharging for individual cells 8 simply and without additional components, since protective element 2 has a high resistance below its switching threshold, and therefore at the same time can be used as a separator that spatially separates electrodes 11 as well.

Figure 2:
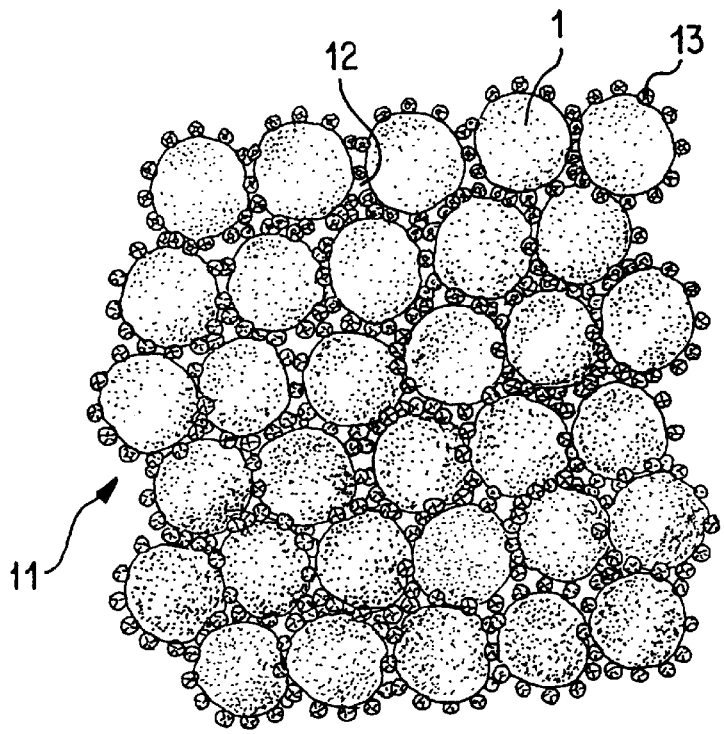
FIG. 2 is a section through an electrode of an individual cell, made with grains as structural material.

FIG. 2 shows an enlarged section of electrode 11 of the individual cells 8 in FIG. 1. As mentioned above, this section through the structure of the electrode corresponds to the theoretical structure of a charge exchange body, so that this design can also be transferred in simple fashion to a catalyst of the charge exchange type. To avoid unnecessary repetition, therefore, only an electrode 10, 11 that is theoretically of the same design will be discussed in this document.

Electrodes 10, 11 are composed of individual grains 1 of the structural material (especially grains that are approximately spherical) which are joined to one another at their contact surfaces. The connection can be formed by sintering for example, or by gluing with an adhesive which is advantageously an electrical conductor. Copper is especially suitable as an adhesive or binder. Ideally, grains 1 have on their surfaces a substance 13 whose specific electrical conductivity is greater than the conductivity of the structural material, which facilitates particularly efficient extraction of the current from the electrodes.

The average diameter of grains 1 of the structural material is less than 1 μm (especially smaller than 250 nm), with at least 60% of all the grains 1 in the structural material being located within a range that differs by a maximum of 40% from its statistical average. It is most desirable if grains 1 differ from one another by a maximum of 10% in terms of their volume.

Approximately corresponding masses of approximately spherical grains 1 (before they are bonded together), can be arranged in a very tight packing of the spheres, so-called cubic space-centered spherical packing, as shown in idealized form in FIG. 2 with two layers of grains 1, one on top of the other, in a top view.

For a charge exchange body such as electrode 10, 11, this means that in a unit cell derived in abstract form from the physics of crystals, the atoms of the unit cell, which are postulated to be spherical in the crystallographic model of a unit cell, can be simply exchanged with the spherical grains 1 of the structural material, at least in a rough approximation. Thus, the microscopic structure of electrodes 10, 11 can be represented by a periodic sequence of the abstracted unit cell and there is always a cavity 12 which can be defined within narrow limits as well as a defined free surface. Hence there is also a defined contact surface between individual grains 1.

The presence of such a unit cell in the structure of electrodes 10, 11 is therefore highly favorable, since the contact surface of grains 1 with one another has a mathematically determinable relationship and as a result, at a desired capacity and predetermined layer thickness of electrodes 10, 11, the size of grains 1 can be calculated simply. As a result, the manufacture of charge exchange bodies according to the invention (in the present case, electrodes 10, 11), is possible within narrow limits, with high reproducibility and a consequent low rejection rate.

It is especially advantageous in this connection that, because of the small grain size of grains 1, electrodes 10, 11 can be made very thin. This results in smaller external dimensions of an electrochemical storage device 9, since electrodes 10, 11 contribute to the width of individual cell 8 in the present design of individual cell 8 and as a result in electrochemical storage devices 9 with a plurality of individual cells 8, also contributes accordingly to the total width of the electrochemical storage device 9.

In the following, the process for manufacturing charge exchange bodies according to the invention such as electrodes 10, 11 or catalysts of the charge exchange type will be discussed with reference to FIGS. 3 to 6.

Figure 3:
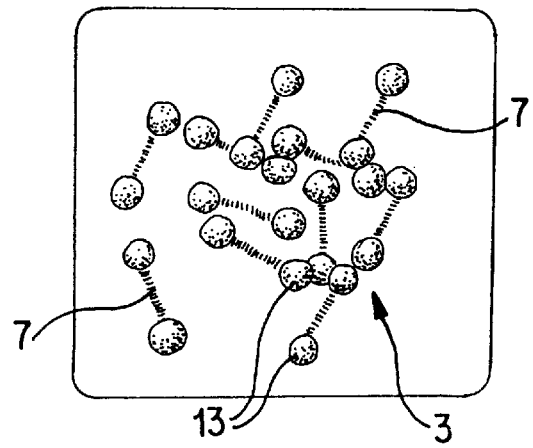
FIG. 3 is a schematic diagram of a dispersion with a liquid phase and with lipids.

FIG. 3 shows a dispersion 3 which is formed of a solvent and amphiphilic organic molecules 7, which are statistically distributed in the solvent. Advantageously, lipids and/or proteins, especially phospholipids, are used as molecules 7. In the solvent, which constitutes the liquid phase of dispersion 3, a salt which forms structural ions (especially a cation) when dissolved in the solvent is added until the concentration of the liquid phase of the resultant dispersion 3, which is now a salt solution, is at least 0.1M to saturation. The structural ions required to form the structural material may be ions of a chemical element in the periodic table and/or of a corresponding ionized substance or compound.

Figure 4:
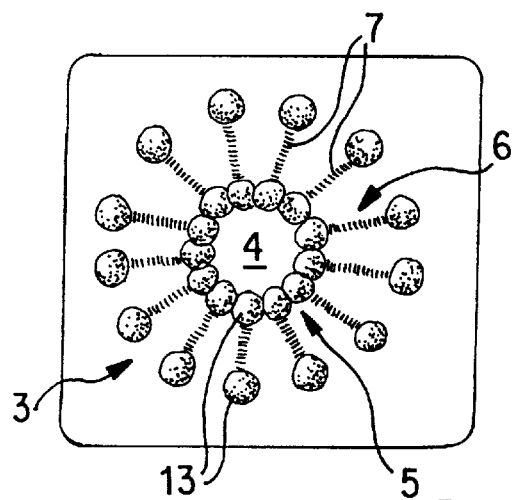
FIG. 4 shows the dispersion shown in FIG. 3, with a vesicle formed from the lipids.
Figure 5:
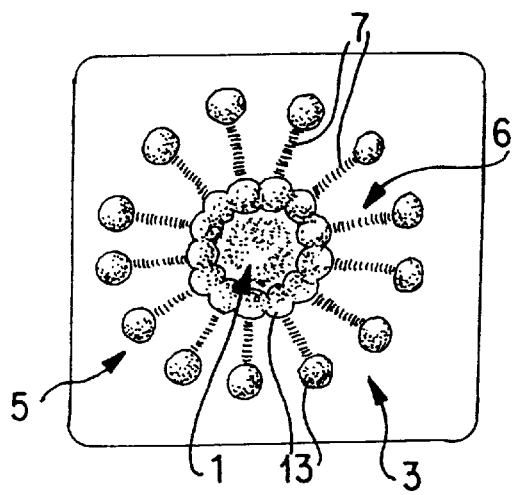
FIG. 5 shows the vesicle of FIG. 4, with a grain located in its cavity as a structural material.
Figure 6:
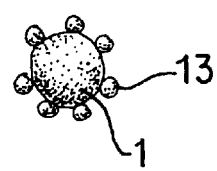
FIG. 6 shows a grain in which the shell of the vesicle in FIG. 5 has been removed.

As shown in FIG. 4. when the dispersion 3 containing the salt is subjected to strong ultrasound, spherical biochemical hollow bodies form from molecules 7, especially in the form of vesicles 5, that are delimited by a shell 6 formed as a double-layered membrane, from molecules 7. The vesicles 5 have a cavity 4 in which parts of the liquid phase of dispersion 3 are enclosed. Because the vesicles 5 form with an inside diameter that is approximately uniform, adjustable (and hence known), the cavity 4 surrounded by shell 6 determines the maximum diameter of the grains 1, as shown in FIG. 6. The size of cavities can be adjusted by the boundary conditions and especially by the choice of molecules 7. The vesicles 5, may also be produced by means of a so-called "French press" especially in a version in which the dispersion is forced at high pressure through a fine-pored filter.

After formation of vesicles 5, the structural ions are removed from the liquid phase of dispersion 3, for example by an ion exchange column. Despite the concentration gradient thus created which promotes diffusion (high concentration of structural ions within cavities 4 of vesicles 5 and negligible to zero concentration of structural ions outside cavities 4), the cationic structural ions remain in cavities 4, since they cannot penetrate shell 6 which is in the form of a double-layered membrane.

Following removal of the structural ions, anions are added to the liquid phase of dispersion 3, which is outside cavities 4 and is free of structural ions. The anions penetrate shells 6 of vesicles 5 and, after diffusing in the respective cavities 4 of vesicles 5, react with the structural ions located therein. The product of this reaction is the structural material (see FIG. 5) or a preproduct of the structural material, which in this case must then be changed into the structural material. For example, such preproducts can be hydroxides which must be modified by known methods such as calcination or the like, into oxides.

In order for electrodes 10, 11 to exhibit a good current removal capacity, the molecules 7 contain an electrically conducting substance 13, that remains on grains 1 of the structural material or on the surfaces of the corresponding preproducts during and after the removal of shells 6 of vesicles 5. The electrical conductivity of the remaining substance 13 is greater than that of the structural material, so that there is a good electrical connection between the individual grains 1.

Ideally, the conversion of the preproduct into the structural material takes place simultaneously with the removal of shells 6 of vesicles 5. For this purpose, the temperature is adjusted so that, simultaneously with the removal of shells 6 of vesicles 5, the preproduct located in cavity 4 is calcined and only a grain 1 of the structural material remains. The shells 6 of the vesicles can also be removed in a protective manner, by means of a suitable solvent. (It is particularly advantageous in this regard that molecule 7 can be recycled for reuse.) Grains 1 thus obtained are similar, within the limits stated above.

To shape electrode 10, 11, grains 1 are placed in a mold and joined together according to the design of electrodes 10, 11. This connection can be produced in particular by an adhesive that possesses good electrical conductivity. Advantageously, copper is used as the binder or adhesive. Another possibility is to sinter grains 1 in the form of the later electrode 10, 11, with this advantageously being performed under pressure. Sintering offers the advantage that the heat during sintering can eliminate foreign matter. In particular, when grains 1 of a preproduct of the structural material are present, the effect of heat during sintering can be used simultaneously to convert the preproduct into the structural material.

As a specific example of the foregoing process, the manufacture of $LiMnO_4$ cathode 11 as a charge exchange body will now be described. To produce cathode 11 with the formation of a dispersion 3, $LiNO_3$, $Mn(NO_3)_2$ and lipids are added to a liquid that acts at least partially as a solvent. Dispersion 3 is exposed to ultrasound, so that vesicles 5 form from the lipids, the inside diameter of the cavities 4 of said vesicles being adjustable between approximately 10 nm and 500 nm. Then hydrolysis is performed with dispersion 3 containing vesicles 5, so that Li-Mn-hydroxide is precipitated out in cavity 4 of vesicles 5. After this reaction is complete, dispersion 3 is calcined in cavities 4 of vesicles 5, with removal of shells 6 of vesicles 5. After calcination, grains 1 of $LiMnO_4$ are obtained with a defined grain size and are shaped to form cathode 11, with the aid of copper as a binder for example.

As the salt combination, it is recommended to use readily soluble salts for making saline dispersion 3. Irradiation or exposure to sound vibrations is advantageously performed in the range of 20 kHz, with the sound intensity being so low that it is practically impossible to measure. The precipitate is obtained by precipitating dispersion 3 contained in cavity 4 after formation of vesicle 5, with a solution of an anion that forms a slightly soluble precipitate with the varistor ion.

Instead of the example of manufacture using vesicles, other biochemical cavities can be used such as micelles, microemulsions, ferritin, and the like, with the process of formation of the grains inside the biochemical cavities with the aid of osmosis and the pH gradient as well as the removal of the shells of biochemical cavities being analogous, for which reason, in order to avoid unnecessary repetition, no discussion in greater detail will be presented. It is apparent that for this purpose the pH must be adjusted to a value other than 7.0—that the dispersion is not neutral.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for manufacturing a charge exchange body having an active surface that is larger than an outer surface of the charge exchange body, in which method grains of a structural material are produced and bonded to form a supporting structure, said method comprising the steps of:

to produce grains with an average diameter smaller than 1 µm, forming a dispersion comprising a solvent and biochemical hollow bodies, said biochemical hollow bodies comprising a material selected from the group consisting of lipids, proteins, micelles, ferritin and microemulsions, and having cavities with an average inside diameter smaller than 1 µm, with the inside diameter of more than 60% of the hollow bodies differing by a maximum of 40% from their statistical average;

adding to said dispersion salts which are soluble therein, and which form structural ions of an element or compound required for the structural material, whereby said structural ions enter the cavities of the hollow bodies;

forming enclosed grains of the structural material or a preproduct of corresponding shape from the structural ions in cavities of the hollow bodies;

removing the hollow bodies, leaving behind the enclosed grains of the structural material or preproduct; and molding said grains to form said charge exchange body.

2. Method according to claim 1 wherein said grains have an approximately spherical shape.

3. Method according to claim 1 wherein a substance is located on the surface of grains of the structural material that has a higher electrical conductivity than the structural material.

4. Method according to claim 1 wherein diameters of said grains have a standard deviation of a maximum of 10% from an average value of said diameters.

5. Method for producing a charge exchange body in which grains are produced from a structural material suitable for forming a supporting structure and are connected to form the supporting structure, said method comprising the steps of:

forming a dispersion which includes biochemical hollow bodies comprising amphiphilic organic molecules selected from the group consisting of lipids, proteins, micelles, ferritin and microemulsions, said biochemical hollow bodies having cavities with an approximately uniform inside diameter;

adding to said dispersion salts which are soluble therein and form structural ions of a substance required for the structural material whereby said structural ions enter the cavities of the hollow bodies located in dispersion;

forming enclosed grains of the structural material or a preproduct of corresponding shape from the structural ions in cavities of the hollow bodies;

removing the hollow bodies, leaving behind the enclosed grains of the structural material or preproduct; and molding said grains to form said charge exchange body.

6. Method according to claim 5 wherein said hollow bodies comprise vesicles produced by:

dissolving said amphiphilic organic molecules in a liquid to produce said dispersion; and exposing said dispersion to ultrasound.

7. Method according to claim 5 wherein said amphiphilic organic molecules comprise phospholipids.

8. Method according to claim 5 wherein said dispersion is adjusted to a pH value other than 7.

9. Method according to claim 5 wherein the salts forming the structural ions are added to the dispersion before the hollow bodies are formed.

10. Method according to claim 5 wherein, prior to formation of the hollow bodies, salts are dissolved in the dispersion that have a cation as the structural ion.

11. Method according to claim 5 wherein said dispersion is saturated with the salts that form the structural ions, with a concentration of greater than 0.1M being produced.

12. Method according to claim 5 wherein said dispersion is saturated with the salts forming the structural ions before the hollow bodies are formed, with a concentration higher than 0.1M being produced.

13. Method according to claim 5 wherein:

prior to formation of the hollow bodies, salts are added to said dispersion, which salts have a cation as the structural ion;

after the formation of the hollow bodies, the structural ions are removed from the salt solution located outside cavities of the hollow bodies; and anions are added to the largely structural-ion-free salt solution, which anions can permeate shells of the hollow bodies whereby precipitation of the structural material or preproduct is triggered.

14. Method according to claim 5 wherein, after formation of grains of the structural material, shells of the hollow bodies are removed from grains of the structural material or preproduct, by heating.

15. Method according to claim 5 wherein shells of the hollow bodies are removed from grains by heat, and at the same time the preproduct is calcined to form the structural material.

16. Method according to claim 5 wherein molecules used to form the hollow bodies each contain an electrically conducting substance, said substance remaining on the surface of grains during the removal of shells from the hollow bodies of grains of the structural material or the preproduct, with remaining substance having a higher electrical conductivity than the structural material.

17. Method according to claim 6 wherein shells of the hollow bodies are removed by means of a solvent.

18. Method of manufacturing grains of structural material for a charge exchange body, having an active surface area for exchange of charge carriers which is greater than an exterior surface area thereof, said charge exchange body comprising grains of a structural material which are joined together to form a supporting structure for an active material, said method comprising the steps of:

making a dispersion comprising a solvent and amphophilic organic molecules;

adding to said dispersion a salt which forms structural ions in said dispersion, which structural ions are capable of forming said grains of structural material;

forming said amphiphilic organic molecules in said dispersion into hollow bodies having exterior shells and interior cavities, said cavities having an inside diameter of less than 1.0 $\mu$m, with said inside diameter of at least 60% of said cavities differing by less than 40% from an average inside diameter of all such cavities;

removing said structural ions from said dispersion outside said cavities;

adding anions to said dispersion, whereby said anions diffuse into said cavities and react with said structural ions to produce the structural material or a preproduct of the structural material; and removing said shells, releasing grains of structural material, said grains having a diameter and surface contour which conforms to said cavities.

19. Method according to claim 18 wherein said forming step comprises subjecting said dispersion to sound vibrations.

20. Method according to claim 19 wherein said sound vibrations have a frequency in a range of 20 kHz.

21. Method according to claim 18 wherein said organic molecules are selected from the group consisting of lipids, proteins, micelles, ferritin and microemulsions.

22. Method according to claim 21 wherein said organic molecules are phospholipids.

23. Method according to claim 18 wherein a pH value of said dispersion is adjusted to a value other than 7.0.

24. Method according to claim 18 wherein said grains of structural material have a substantial spherically shape.

25. Method according to claim 18 wherein a substance that has a higher electrical conductivity than the structural material remains on a surface of said grains of structural material.

26. Method according to claim 18 wherein diameters of the individual grains of the structural material have a standard deviation of a maximum of 10% from their average value.

27. Method according to claim 18 wherein said salt is added to said dispersion before said forming step.

28. Method according to claim 18 wherein said salt forms the structural ion as a cation.

29. Method according to claim 18 wherein said dispersion is saturated with said salt, with a concentration of greater than 0.1M.

30. Method according to claim 26 wherein said salt is added to said dispersion before said forming step.

31. Method according to claim 18 wherein said step of removing said shells comprises heating said dispersion.

32. Method according to claim 18 wherein the preproduct is calcined to form the structural material.

33. Method according to claim 18 wherein said molecules used to form the hollow bodies each contain an electrically conducting substance, said substance remaining on the surface of said grains during removal of said shells from said grains, with said remaining substance having a higher electrical conductivity than the structural material.

34. Method according to claim 18 wherein said shells of said hollow bodies are removed by means of a solvent.

\* \* \* \* \*